(12) United States Patent
Einarsson et al.

(10) Patent No.: US 8,046,479 B2
(45) Date of Patent: Oct. 25, 2011

(54) MEDIA CHANNEL MANAGEMENT

(75) Inventors: Torbjorn Einarsson, Stockholm (SE); Uwe Horn, Aachen (DE); Thorsten Lohmar, Aachen (DE); Ignacio Mas Ivars, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 724 days.

(21) Appl. No.: 11/826,026

(22) Filed: Jul. 11, 2007

(65) Prior Publication Data

US 2008/0109853 A1 May 8, 2008

Related U.S. Application Data

(60) Provisional application No. 60/857,121, filed on Nov. 7, 2006.

(51) Int. Cl.
G06F 15/16 (2006.01)
(52) U.S. Cl. ........................................ 709/230; 709/217
(58) Field of Classification Search ........................ None
See application file for complete search history.

(56) References Cited

U.S. PATENT DOCUMENTS

| | | | |
|---|---|---|---|
| 6,185,602 B1 | 2/2001 | Bayrakeri | |
| 6,195,680 B1 | 2/2001 | Goldszmidt et al. | |
| 6,539,481 B1 | 3/2003 | Takahashi et al. | |
| 6,704,790 B1 | 3/2004 | Gopalakrishnan | |
| 6,769,127 B1 | 7/2004 | Bonomi et al. | |
| 6,771,644 B1 | 8/2004 | Brassil et al. | |
| 7,394,807 B2 * | 7/2008 | Hamiti et al. ................. | 370/389 |
| 7,571,244 B2 | 8/2009 | Costanzo et al. | |
| 7,630,328 B2 * | 12/2009 | Wright et al. ................. | 370/260 |
| 7,724,691 B2 * | 5/2010 | Mela et al. .................... | 370/261 |
| 7,852,859 B2 * | 12/2010 | Wengrovitz et al. .......... | 370/397 |
| 2002/0124262 A1 | 9/2002 | Basso et al. | |
| 2004/0056985 A1 | 3/2004 | Seong | |
| 2004/0073629 A1 * | 4/2004 | Bazot et al. ................... | 709/217 |
| 2004/0088741 A1 | 5/2004 | Tsai et al. | |
| 2005/0080904 A1 | 4/2005 | Green | |
| 2005/0183120 A1 | 8/2005 | Jain et al. | |
| 2006/0253599 A1 * | 11/2006 | Monteiro et al. ............. | 709/230 |
| 2007/0168534 A1 * | 7/2007 | Hiltunen et al. .............. | 709/230 |

FOREIGN PATENT DOCUMENTS

| | | |
|---|---|---|
| EP | 1 333 639 | 8/2003 |
| WO | WO 02/07440 | 1/2002 |
| WO | WO 02/09009 | 1/2002 |

(Continued)

OTHER PUBLICATIONS

Ericsson, 3, NEC: "Fast Channel Switching for PSS based Mobile TV", Aug. 28-Sep. 1, 2006.

(Continued)

*Primary Examiner* — John B. Walsh
(74) *Attorney, Agent, or Firm* — Nixon & Vanderhye P.C.

(57) ABSTRACT

A method of managing a unicast-based media session is disclosed. A user terminal having access to channel identifiers of media channels available at a media server compiles a SIP-based channel request comprising a channel identifier of one of the available media channels and a port identifier of at least one media input port of the terminal. This message is sent to a network node for initiating delivery of media data of selected media channel to the announced media input port. The SIP-based data signaling also allows switching between unicast-based media channels and switching between unicast-bast and multicast/broadcast-based media channels during the ongoing media session.

4 Claims, 12 Drawing Sheets

FOREIGN PATENT DOCUMENTS

| WO | WO 2004/021668 A1 | 3/2004 |
|---|---|---|
| WO | WO2004/021668 A1 | 3/2004 |
| WO | WO 2006/057606 A1 | 6/2006 |
| WO | WO2006/057606 A1 | 6/2006 |
| WO | WO 2006/096104 | 9/2006 |
| WO | WO 2006/096104 A1 | 9/2006 |

OTHER PUBLICATIONS

Ericsson, "Use-Case and Requirements for Fast Channel Switching", Oct. 20, 2006.

International Search Report for PCT/SE2007/050795 mailed Apr. 2, 2008.

3GPP TS 26.234 v7.1.0; $3^{rd}$ Generation Partnership Project; Technical Specification group Services and System Aspects; Transparent end-to-end Packet-switched Streaming Service (PSS); Protocols and codecs, Dec. 2006.

Network Working Group, Request for Comments: 2326, Apr. 1998, Real Time Streaming Protocol (RTSP).

Network Working Group, Request for Comments: 3261, Jun. 2002, SIP: Session Initiation Protocol.

Network Working Group, Request for Comments: 2327, Apr. 1998, SDP: Session Description Protocol.

U.S. Appl. No. 11/666,891, filed May 3, 2007; Inventor: Einarsson et al.

Office Action mailed Oct. 6, 2009 in co-pending U.S. Appl. No. 11/666,891.

Office Action mailed Apr. 1, 2010 in co-pending U.S. Appl. No. 11/666,891.

International Preliminary Report on Patentability mailed Jul. 4, 2007 in corresponding PCT application PCT/SE2005/001768.

English translation of Chinese Office Action mailed May 8, 2009 in corresponding Chinese Application No. 2005/80047129.7.

European Office Action mailed Nov. 27, 2009 in corresponding European Application No. 05 804 728.3.

International Search Report of PCT/SE2005/001768, mailed Apr. 3, 2006.

RealNetworks: "realplayer™ plus—Realplayer 8 Plus User Manual", RealNetworks, [Online] 2000, pp. 1-106, XP002371294.

Henning Schulzrinne, "Internet Media-on-Demand: The Real-Time Streaming Protocol", Dept. of Computer Science, Columbia University, Dec. 4, 2001, pp. 1-50, XP002371295.

Office Action mailed Oct. 6, 2010 in co-pending U.S. Appl. No. 11/666,891.

Office Action mailed Mar. 14, 2011, in co-pending U.S. Appl. No. 11/666,891.

H. Schulzrinne et al.; Network Working Group, Request for Comments: 2326, Apr. 1998, Real Time Streaming Protocol (RTSP) (82 pages).

J. Rosenberg et al.; Network Working Group, Request for Comments: 3261, Jun. 2002, SIP: Session Initiation Protocol (237 pages).

M. Handley et al.; Network Working Group, Request for Comments: 2327, Apr. 1998, SDP: Session Description Protocol (38 pages).

* cited by examiner

MEDIA CHANNEL MANAGEMENT

This application claims the benefit of Provisional Application No. 60/857,121, filed 7 Nov. 2006, the entire content of which is hereby incorporated by reference in this application.

TECHNICAL FIELD

The generally relates to management of media sessions in communications systems, and in particular, to reducing the user-perceived time of switching media channels in such media sessions.

BACKGROUND

It has become a trend to offer and provide a vast range of new services in existing mobile networks and mobile communications systems. There is currently a very big interest in using mobile networks for multimedia or TV content. This is often referred to as Mobile-TV in the art. The goal for Mobile-TV applications is to offer a TV-like experience where the user can choose and easily zap between different multimedia or TV channels.

Ordinary TV channels are broadcasted to many users and typically the user can choose which channel to receive and view. Mobile-TV is similarly about delivering a set of (live) media or multimedia streams to several end-users. Each multimedia stream corresponds to a TV-channel, and each user shall be able to choose which channel to view. At the moment, broadcast/multicast delivery methods for Mobile-TV are under development. Examples of such standardisation efforts are 3GPP Multimedia Broadcast/Multicast Services (MBMS) and European Telecommunications Standards Institute (ETSI) Digital Video broadcasting-Handheld (DVB-H). These will be similar to traditional TV, in their broadcast distribution fashion.

In the meantime, until Mobile-TV based on multicast/broadcast is available, there is a need for solution that can be implemented over existing mobile transport channels. It will also later be of big interest for cells with few users and for networks with enough capacity, where unicast transport is the preferred distribution means.

A mobile TV-like service using streaming over Internet Protocol (IP) based networks can be implemented into existing mobile networks. An example is the Packet-Switched (PS) Streaming Service (PSS) developed in 3GPP. In order to start such a multimedia or TV session, a user typically surfs to a web page or portal and clicks on or selects a link to look at a live-streaming channel.

There also exist several proprietary streaming solutions that could be used for Mobile-TV, e.g. RealNetworks, Apple's Quicktime and Microsoft's media player. These also typically have a portal or web page where a link is clicked to start receiving a certain channel.

One of the goals of Mobile-TV services is to make it possible to zap between channels, as one can do for ordinary broadcasted TV channels. If all channels are broadcasted, the receiver can locally choose between channels by choosing the appropriate transport channel and using an appropriate demultiplexer. This is the case for standard cable, satellite or terrestrial television as well as the upcoming mobile standards MBMS and DVB-H. However, for unicast sessions, the client must instead influence a "server" or multimedia provider to send the desired channel.

The traditional way of doing IP-based mobile streaming is to choose a specified content in a browser. This starts the download of a Session Description Protocol (SDP) or a Synchronized Multimedia Integration Language (SMIL) file, which in turns initiates a Real Time Streaming Protocol (RTSP) streaming session in a media player of a user terminal. The approximate time it takes until a user sees the content on the screen of the user terminal is typically around or slightly over ten seconds of which maybe five seconds is application setup and the rest is signalling (around two seconds) and buffering (around three to four seconds). If the user wants to switch to another "multimedia or TV channel", he must stop the current data stream and go back to the browser where he chooses another channel by clicking a link. Then, a new RTSP session is started, the media player initiates and starts to buffer, and there is a new delay of about ten seconds.

In going beyond browser links for choosing a unicast channel, the simplest approach is to make an application which sets up a new streaming session to new URI (Universal Resource Identifier) every time one switches channel. This is quite general, but is quite slow in that a completely new RTSP signaling process must take place as well as a buffering of content.

In order to remedy this slow process, a faster solution has been developed [1], where each user has a continuous streaming session and can initiate a channel switch by separate signaling over HTTP (Hypertext Transfer Protocol) or another protocol.

SUMMARY

A limitation of the procedure suggested in document [1] is that all channels must be encoded in a similar manner in order to make it possible to make one continuous RTP (Real-time Transport Protocol) session for each media stream.

The technology described herein overcomes these and other drawbacks of the prior art arrangements.

It is a general object to provide an efficient media session management.

It is a particular object to provide media session management that allows for short channel switching times.

Briefly, the technology described herein involves management of a unicast-based media session involving a user terminal and a media server having access to multiple unicast-based media channels. The terminal has access to a channel description comprising identifiers and information of the media channels available at the media server. Once a user would like to watch one of the channels, the user terminal uses the information in the channel description for generating a SIP-based channel request comprising the channel identifier of the selected media channel as provided from the channel description. This SIP-based channel request also comprises a port identifier of at least one media input port of the user terminal. The message is transmitted to a network node, such as the media server or a control server communicating with the media server, for initiating delivery media data of the selected media channel to the announced media input port(s).

The media server will process the received SIP-based channel request or a converted channel request, such as RTSP-based channel request, generated by the control server based on the SIP-based channel request. In this request processing, the server retrieves the channel identifier for providing media content of the correct media channel and sends the content to the port identified in the request.

This SIP-based media session set-up procedure also involves the assignment and notification of a session identifier. If the user subsequently would like to switch to another unicast-based media channel at the media server, the terminal compiles a SIP-based termination message comprising the session identifier. In addition, a second SIP-based channel request is generated comprising the channel identifier of the newly selected channel and the session identifier. The channel request may also comprise one or more port identifiers. These two messages are sent to the network node, causing the media server to interrupt transmission of media content of the previous channel and start providing media content of the new channel. This channel switch will take place during the ongoing media session, without any requirement of tearing down the old session and setting up a new session. A switch between unicast delivery to multicast/broadcast delivery or vice versa may be made during the ongoing media session by putting the unicast session on hold and then re-activating it once the user returns to watch the previous unicast-based media channel or a new unicast-based media channel.

SHORT DESCRIPTION OF THE DRAWINGS

The invention together with further objects and advantages thereof, may best be understood by making reference to the following description taken together with the accompanying drawings, in which.

DETAILED DESCRIPTION

Figure 1A:
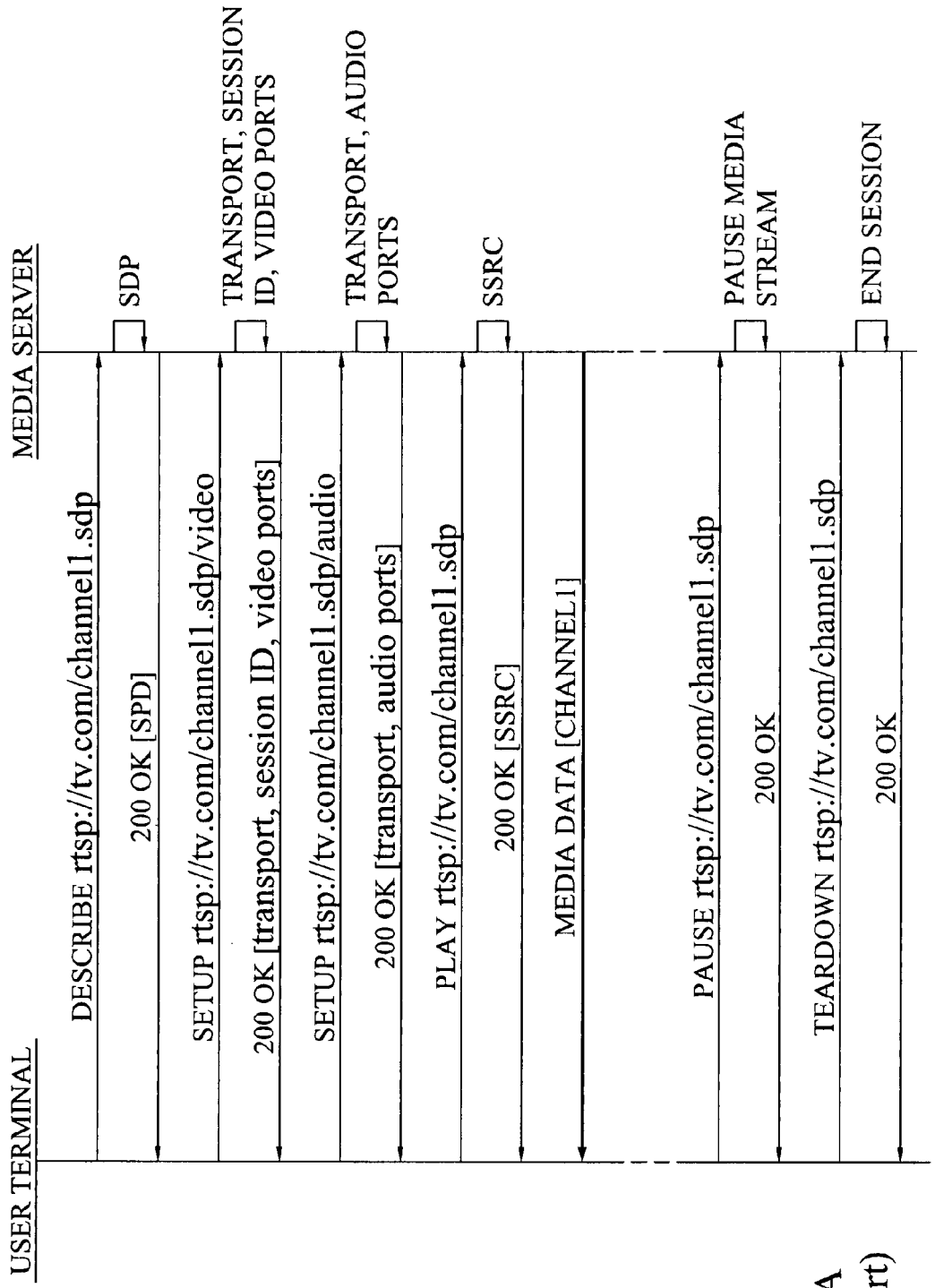
FIGS. 1A and 1B are signal diagrams illustrating a channel setup procedure and a channel switch procedure.

Throughout the drawings, the same reference characters will be used for corresponding or similar elements.

The technology described herein relates to media session management and in particular to managing a unicast-based media session. The session management reduces the number of round trips required for switching unicast-based media channels or for switching between unicast and multicast/broadcast channels.

As a consequence of this reduction in round trip numbers, the user-perceived time of switching media channels becomes lowered, approaching "true" zapping levels. The technology described herein therefore provides a TV-like experience similar to the current ordinary TV system and the forthcoming multicast/broadcast based mobile-TV but in unicast-based communications system. The technology described herein can be applied to any such unicast system and in particular wireless communications systems that employ the Internet Protocol, IP, for data communication. A typical example of such a communications system is a packet switched (PS) system that provides multimedia data to connected users through PS streaming (PSS). For more information of PSS reference is made to the document [2], which is hereby incorporated by reference.

A media channel, for instance, carry "live" media or consist of pre-recorded content containing one or more clips. The media data can be in the form of a media stream, such as a RTP (Real-time Transport Protocol) stream, available on different IP (Internet Protocol) addresses.

The channel switch will, from the user point of view, be much more smoothly experienced, will be performed in a shorter period of time and does not require visiting a multimedia provider's Web page nor setting up a new media session, as the prior art unicast solutions require.

Media or multimedia data includes any form and type of media that can be rendered and displayed at a user terminal. This includes, but is not limited to, images, video, audio and other media types that are capable of being perceived, during rendering, by a user. A media channel typically comprises a video stream and a parallel audio stream.

Figure 1B:
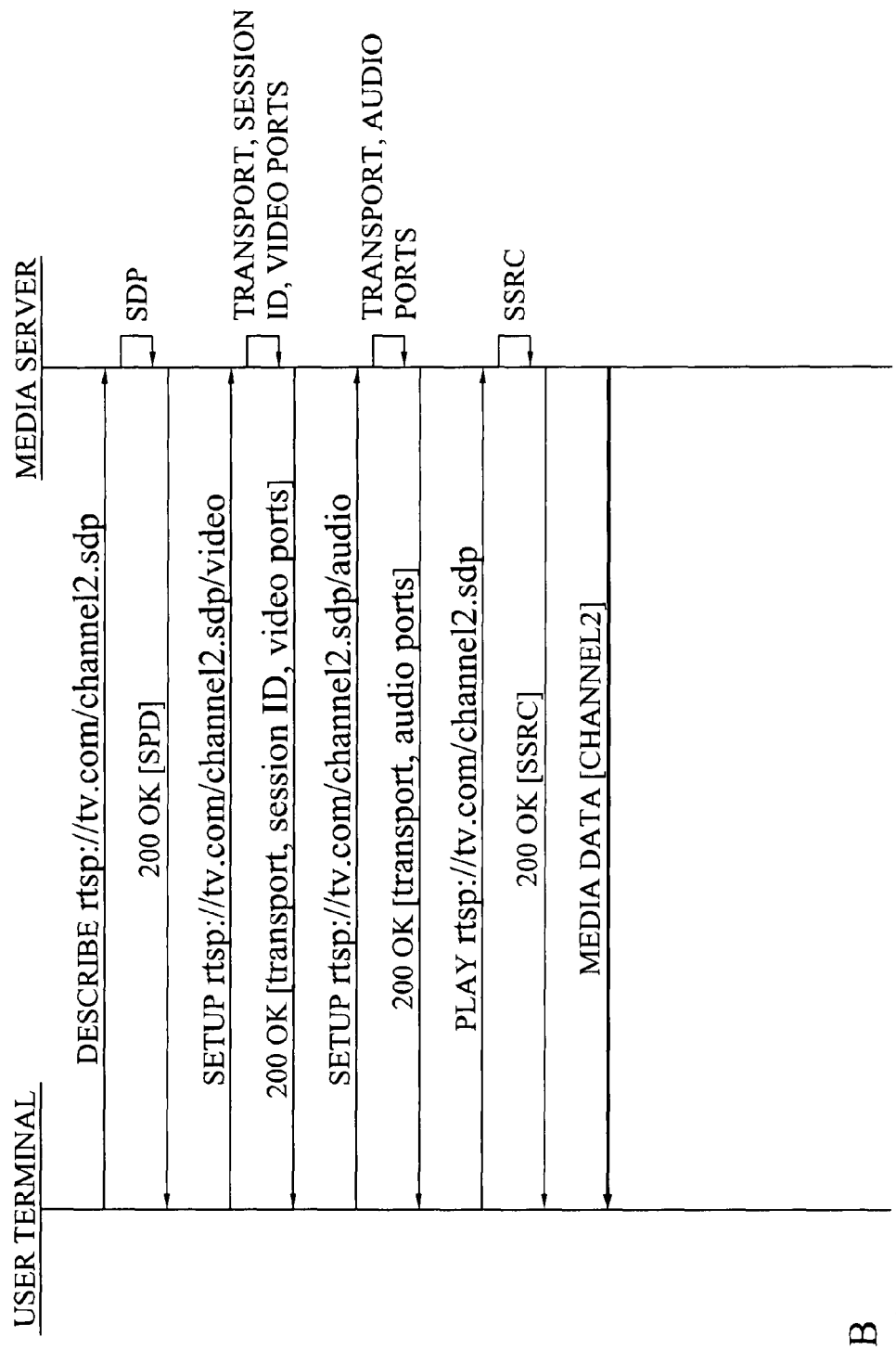

In order to simplify understanding of the technology described herein and the merits thereof, a brief review of the prior art techniques of setting up a unicast-based media session and switching media channels first follows in connection with FIGS. 1A and 1B. These figures illustrate the signaling performed during the setup and management of a Real Time Streaming Protocol (RTSP) session. As is known in the art, RTSP is an application-level protocol for control over delivery of media data with real-time properties.

The RTSP session may be initialized by the compilation and transmission of a DESCRIBE request at the user terminal. In response to the DESCRIBE request, the media server compiles and returns a response (200 OK message) comprising a description of the requested media content. The response typically comprises a Universal Resource Location (URL) of the media description at the media server. This response contains all media initialization information for the requested media content. In a typical implementation, the description is in the form of a Session Description Protocol (SDP) file. This SDP file comprises, among others, the name of the selected media, the transport address and available codecs for the media in addition to the URI of the description information.

The user terminal thereafter compiles and transmits a SETUP request for the Universal Resource Identifier (URI) of the desired media content. A typical media session involves both video and audio content transmitted over a unicast-based media channel. In such a case, the SETUP procedure is performed stepwise for the two content types. For example, the video SETUP request can first be transmitted, comprising the URI of the video content. The request also comprises an indication of the transport parameters acceptable to the user terminal for the media data transmission. These parameters include in particular the client input ports used for the video content. The media server generates, in response to the SETUP request, a session identifier to be used henceforth as an identifier of the current media session. This session identifier is returned together with the transport parameters selected by the server and the video output ports of the server.

A corresponding audio SETUP request and response are communicated between the user terminal and the media server for negotiating audio transport parameters. In clear contrast to the video SETUP message, the audio SETUP request comprises the notified session identifier.

The RTSP session is now successfully setup and the actual media content delivery can be started. The user terminal therefore compiles a PLAY request telling the server to start sending the notified media content via the transport mechanism negotiated during the session setup. The PLAY request may specify a range where the normal play time should be begin or a time parameter specifying a time at which the playback or rendering of the media should start. The media server processes this PLAY request and responds with acknowledged time parameter or range and synchronization information, such as in terms of rtptime in the rtp-information field of the response.

The requested media can then be delivered on the unicast-based media channel using the determined transport mechanism.

If the user subsequently would like to switch to a second unicast-based channel, the current RTSP session must first be ended. This can be implemented by transmitting a PAUSE request comprising the media URI and session identifier to the media server. This causes a temporary interruption of the delivered media stream. However no allocated resources for the stream are freed at this point. The user terminal continues by transmitting a TEARDOWN request to stop the stream delivery for the given URI, freeing the resources associated with it. This ends the current media session. For more information of RTSP, reference is made to the document [3], which is hereby incorporated by reference.

The user terminal is then forced to setup a new RTSP session but for the new media channel as illustrated in FIG. 1B. Thus, the same procedure as was described in the foregoing is once more conducted but with URI of the new media content and with a new session identifier. The channel switch, thus, involves extensive signaling taking six round trips as well as some processing delay in the media server and the user terminal before being able to render the media content of the new media channel.

The technology described herein reduces this extensive signaling in connection with channel switching by choosing media channel via usage of the Session Initiation Protocol (SIP) [4] for requesting and switching multimedia channels during an ongoing unicast-based media session. The document [4] describing SIP is hereby incorporated by reference.

Figure 2:
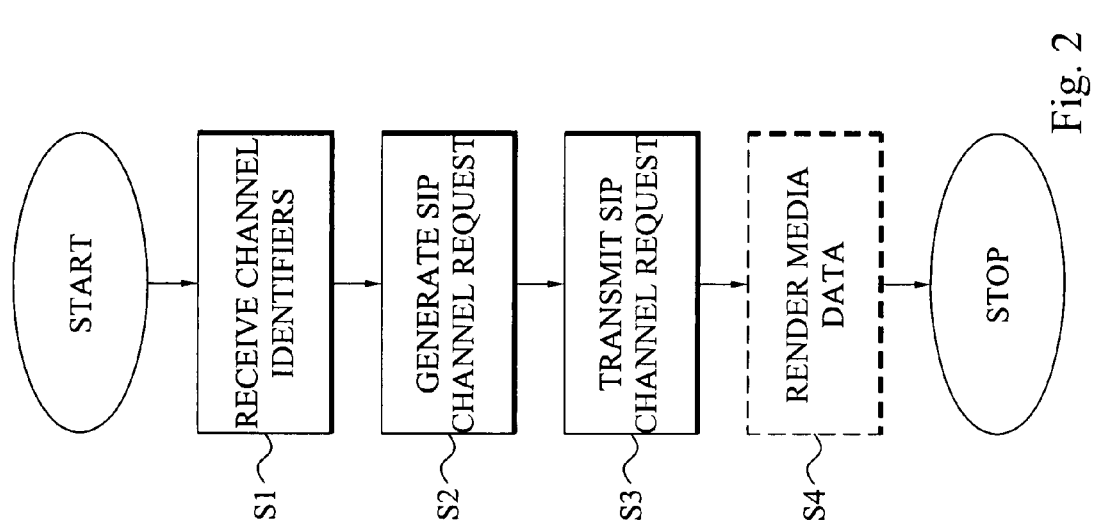
FIG. 2 is a flow diagram illustrating a method of managing a unicast-based media session.

FIG. 2 is a flow diagram of a method of managing a unicast-based media session involving a user terminal (client) and a media server providing multiple, i.e. at least two, different media channels. The method starts in step S1, where the user terminal receives channel identifiers of multiple, i.e. at least two, media channels available at a media server. These multiple media channels can all be adapted for unicast-based transmission, some be dedicated for unicast-based transmission while others are available through multicast/broadcast delivery methods or at least some media channels can be sent to user terminals through both unicast and multicast/broadcast. The user terminal can receive the channel identifiers from the media server itself. In alternative approach, another network node or entity, such as data proxy or media control server can have access to information of different media channels available at one or more media servers in the communication system.

The annotation of channel identifiers is preferably in the form of a user data description comprising, in addition to the identifiers, further information that is useful for the current media session. The description can be in the form of a so-called User Service Description (USD) or Session Description Protocol (SDP) message that is sent to the terminal before, in connection with or even after setting up the media session. This further information can include semantics of the different media channels, such as channel name, media name, etc., and physical information, such identifiers of the respective media output ports of the media server for the different media channels. Other such physical information includes information of the media codecs available for the different media channels and how to get access to them. The USD typically comprises an SDP description of the available (RTP) media streams/channels and the media encoding for each channel.

It is also possible to send the further associated information, such as semantics and physical information, using dedicated messages destined to the user terminal.

The channel identifiers are preferably in the form of Uniform Resource Identifiers (URIs) or Uniform Resource Locators (URLs), which is a compact string of characters used to identify or name a media resource at the media server. More preferably, the identifiers are in the form of SIP URIs/URLs or secure SIP URIs/URLs (SIPS URIs/URLs). If provided in some other format, the user terminal may have to convert the identifier format to a format that is suitable for transmission inside a SIP request message.

It is anticipated that not all channel identifiers have to be sent in a same message and received by the user terminal in step S1. In clear contrast, the annotation of the available media servers can be conducted using one or more messages that can be sent to the terminal at different times before or during the media session.

Once the user terminal has received the channel identifiers it processes the information in the received message(s) to identify the channel identifier associated with a media channel that has been selected by a user. The terminal then generates, in step S2, a SIP-based channel request comprising the channel identifier associated with the selected media channel and provided from the received channel identifiers. The SIP request preferably also comprises identifiers of at least one input media port of the user terminal, to which media data packets of the selected media channel are to be transmitted. The input port can be an input video port, an input audio port but is most often two ports, one for video and another for audio.

In a preferred implementation, the SIP request also comprises information of a media codec selected by the user terminal. This codec selection is preferably performed by the terminal based on the information received together with the channel identifiers. Thus, if media data of a given media channel can have been or can be encoded using several different codecs, the user terminal has a choice in selection of a preferred media codec. For example, the terminal may only support decoding media data encoded using one or more of the available codecs. The terminal can then select and annotate the codec that is most suited to the capabilities of the terminal, the current media and/or traffic situation.

The generated SIP request preferably also comprises an identifier of the user terminal to allow the media server to identify the terminal during the session. This identifier can be in the form of an URI/URL, such as SIP URI/URL or SIPS URI/URL. It can also possible to use the media port identifier(s) as terminal identifiers. A further alternative is the usage of a session identifier, typically selected by the media server and sent to the user terminal.

In a preferred example implementation, the generated SIP channel request is a SIP INVITE message. This means that SIP is used in a new way be employing SIP INVITE with a session description (channel identifier, port identifier, codec identifier and terminal identifier) to start up media stream towards user terminals on specific terminal-chosen ports. There is a major advantage in being able to use the standard interpretation of the SIP INVITE message but in a new context as defined by the present invention. A non-limiting example of such a SIP INVITE channel request is presented below:

INVITE sip:channel1@unicastserver.comSIP/2.0
Via: SIP/2.0/UDPpc33.eicsson.com; branch=z9hG4bK776asdhds
To: sip:channel1@unicastserver.com
From: tobbe <sip:tobbe@ericsson.com>; tag=1928301774
Call-ID: a84b4c76e66710@pc33.ericsson.com
CSeq: 1 INVITE
Contact: >sip :tobbe@pc33.ericsson.com>
Content-Type: application/sdp
Content-Length: 131

The lines above constitute the header in the SIP INVITE channel request. The following lines an example content of the SDP file:

v=0
o=sip:tobbe@ericsson.com 2890844526 2890842807 IN IP4 126.16.64.4 10.0.0.2
s=Mobile TV Channel 1
i=Channel 1 as provided over unicast
c=INIP4 10.0.0.1
t=0 0
a=recvonly
m=video 10000 RTP/AVP 96
b=AS:86
a=rtpmap:96 H264/90000
a=fmtp:96 profile-level-id=42F00B; sprop-parameter-sets=ZOLwC5ZSBYnI, aM48gA==;
packetization-mode=1
m=audio 10002 RTP/AVP 97
b=AS:24
a=rtpmap:97 MP4A-LATM/32000/2
a=fmtp:97profile-level-id=15; object=2; cpresent=0; config=400028103FC0

For more information of SIP INVITE message and SDP file formats, references are made to [4] and [5], which are hereby incorporated by reference.

The important thing here is that by using a SIP INVITE message in this way, the terminal can specify the ports it wants to receive the media at. Also the offer-answer model used in SIP typically requires that the terminal should be able to receive media on the ports it has offered right after the terminal has sent the offer. Thus, there is a minimal delay in turns of message round-trips.

In a next step S3, the user terminal transmits the SIP-based channel request to a network node, i.e. the media server or a control server, for initiating delivery of media data of the selected media channel to the at least one input terminal offered in the channel request.

In a next step S4, the media server identifies the correct media channel based on the channel identifier in the SIP request, selects which codec to use based on the codec identifier and transmits the media of the selected media channel to the notified input port(s) of the terminal. The media terminal can then start rendering the media data, typically after media decoding and buffering in a jitter buffer. The method then ends.

Figure 3:
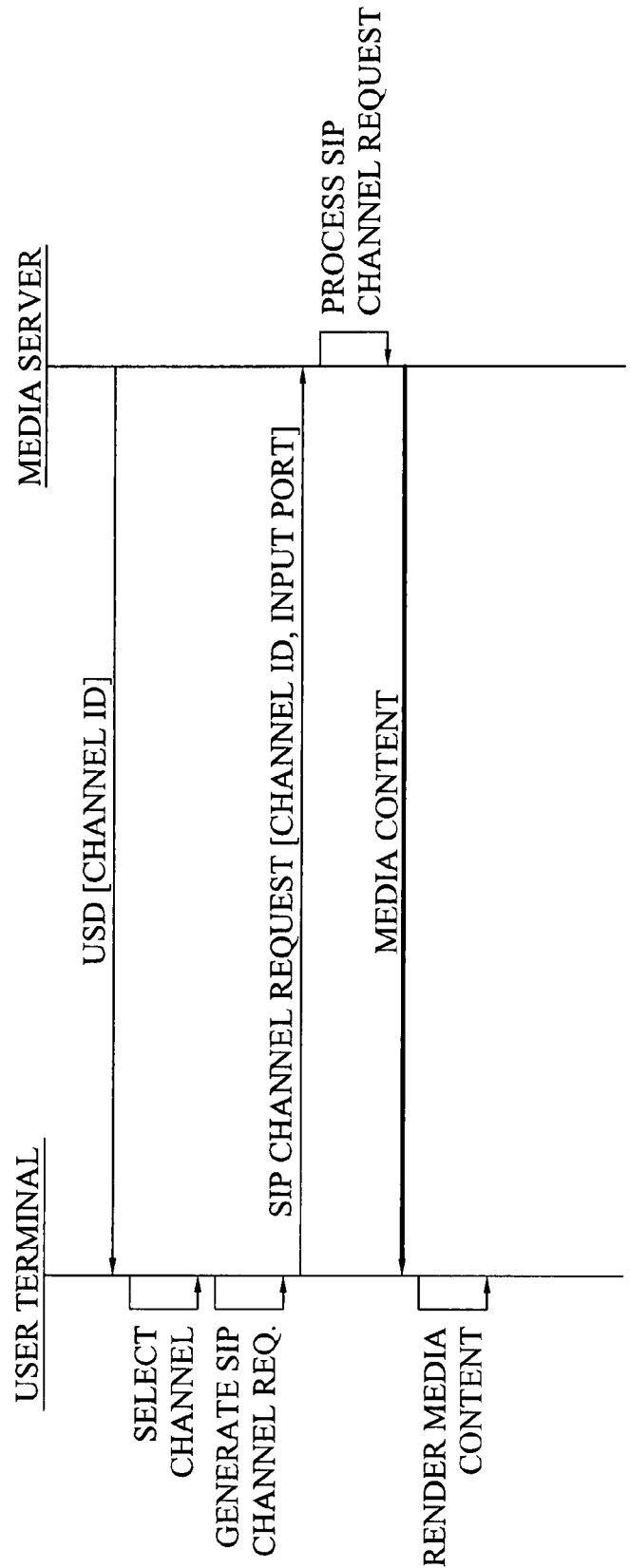
FIG. 3 is a signal diagram illustrating a media session setup procedure according to an example embodiment.

FIG. 3 is a signal diagram representation of the above described method of setting up a unicast-based media session. A media server transmits an USD with channel identifiers and preferably other associated media channel information to a user terminal before or in connection with setting up the media session. This USD can be sent to the terminal via a downloading or is broadcast.

The terminal processes the USD for identifying the channel identifier that is associated with the media channel the user has selected. The terminal then generates the SIP INVITE message with attached SDP description containing the selected channel identifier and media input port(s) of the terminal. Also further information retrieved form the USD, such a codec identifiers, channel/file name, can be included in the message. The request is sent to the media server, which processes the message to identify the correct media channel and where the media data thereof is to be transmitted. The content is then sent to the user terminal, where it can be rendered.

The above presented signal diagram is a simplified representation of the signaling taking place between the terminal and server in connection with session step up. As is known in the art, further signaling is most often taking place by responses (200 OK messages) generated and sent in response to the request. Thus, following the reception of the SIP INVITE message, the server responds by a response message (200 OK). Once the terminal has received the response, it can return an acknowledge media, informing the media server that it is now ready for receiving the requested media data.

The first response message from the media server typically comprises a session identifier selected by the server and used for identifying the current media session. Alternatively, the user terminal can select this session identifier and then preferably includes it in the SIP INVITE request.

As is described further herein, the transmission between the user terminal and media server often, at least initially, employs proxy servers that help routing requests to the correct locations and which also can be involved in authentication, authorization and charging services for the media session.

Figure 4:
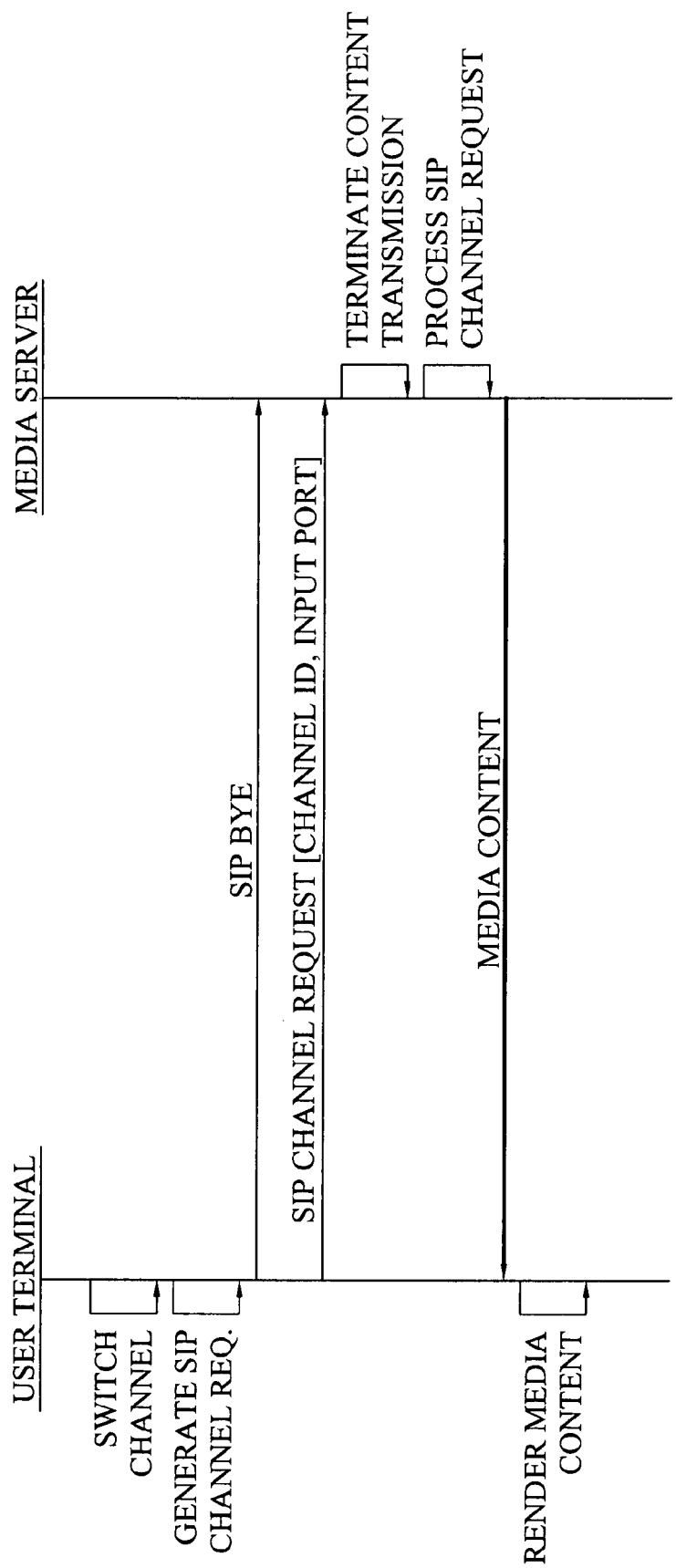
FIG. 4 is a signal diagram illustrating a media channel switch for a media session according to an example embodiment.

FIG. 4 is a signal diagram illustrating the possibility of switching multimedia channel during an ongoing unicast-based media session. The user terminal receives an input from the user that he/she instead would like to watch a second media channel having a channel identifier that the user terminal previously has been received. This channel identifier can have been received together with the channel identifier of the current "old" channel in the USD or could have been sent separately to the terminal.

The user terminal generates a SIP-based termination message comprising the previously assigned session identifier. This termination message is sent to the media server, informing the server to stop transmitting media data of the current channel to the user terminal. Simultaneously with, before or after the generation of the SIP-based termination message, the terminal also generates a new SIP-based channel request message. This request message comprises the channel identifier of the selected media channel and at least one media input port of the terminal, to which the media data of the new channels should be transmitted. In a preferred embodiment, the at least one input port is the same input port that was used for the data delivery of the previous media channel. This means that the media ports of the terminal are re-used also for this new channel. Instead of re-sending the port identifiers, the terminal could simply transmit a notification specifying that the same input port(s) is (are) to be re-used for the new media channel.

In a preferred implementation, the SIP-based channel request also comprises the previously assigned session identifier allowing the media server to identify the relevant media session and the user terminal. In a particular embodiment, this session identifier could actually also be used as input port identifier if the same input ports are to be used and no dedicated notification is sent to the server. The server could then operate according to a default procedure that involves using the previously announced media input ports that are employed in the media session indicated by the session identifier.

Also other information, as was previously described, can be included in the SIP INVITE, such as media codec of the new media channel selected by the media server.

The user terminal sends the SIP-based channel request to the media, possibly via proxy servers and/or control servers. This request transmission could be a separate message forwarding or could be interleaved with the SIP-based termination message. In either case, the media server processes the received channel request by identifying the relevant media channel using the channel identifier, identifying the relevant user terminal and the terminal ports to which the new media is to be transmitted based on the port identifier(s) and/or session identifier.

Media content of the new channel can then be sent from the server to the notified input ports of the terminal, where the media, following decoding and buffering, is rendered by the terminal or on a connected dedicated media player.

Only a single message (SIP INVITE) is needed to start sending media content of a new unicast channel to the desired terminal ports. This dramatically decreases the switching delay for media flows and improves the switching delay as compared to the prior art solution illustrated in FIGS. 1A and 1B.

Figure 5:
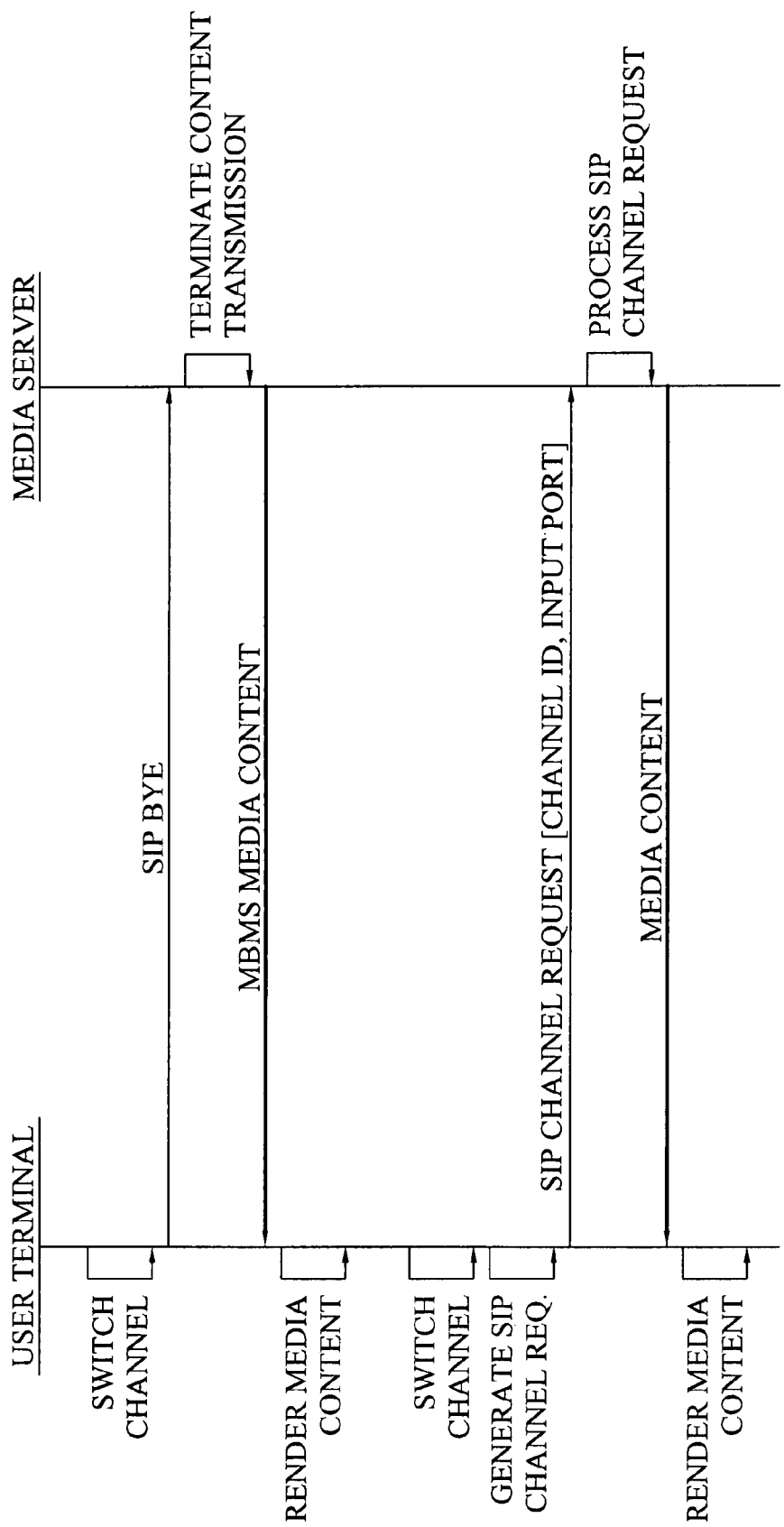
FIG. 5 is a signal diagram illustrating a channel switch between unicast and broadcast media channels for a media session according to an example embodiment.

The present SIP-based multimedia session management and channel switching can also be employed for switching between unicast and multicast/broadcast channels provided by a media server. FIG. 5 is a signal diagram illustrating this approach.

The user terminal receives a channel switch input of the user from a current unicast-based media channel to a new multicast/broadcast-based media channel available at a media server. The user terminal compiles and transmits a SIP-based termination message comprising the session identifier of the current media session as described above. This causes the media server to terminate transmission of media content of the current media channel. The terminal then joints a multicast channel using IGMP (Internet Group Management Protocol). The IP address and output ports of the new multicast/broadcast channel have previously been received by the user terminal, e.g. included in the above-described USD or in a separate download/broadcast transmission. Media content is received on the multicast/broadcast channel and rendered at the user terminal following decoding and buffering. Note that this switch from unicast to multicast/broadcast delivery is taking place inside the ongoing media session. This means that no session termination followed by a new session set-up initiation is required, which significantly speeds up the channel switch.

If the user subsequently would like to switch back to the previous unicast-based media channel or another unicast channel available at the media server, the terminal simply compiles and transmits an IGMP leave message regarding the current multicast/broadcast channel. In addition, a SIP-based channel request message is generated by the terminal, where this request comprises the channel identifier of the new unicast channel, retrieved from the USD or some other channel description, identifiers of the desired media input port(s) to use for the media delivery and preferably the previously assigned session identifier. As was mentioned in the foregoing in connection with unicast-to-unicast switching, the same input ports as was previously used in the session are preferably re-used also for the new unicast channel. The discussion regarding port identifiers above in connection with FIG. 4 applies mutatis mutandis to the present embodiment.

The media server processes the received SIP INVITE/request message to identify the correct media channel (using channel identifier), identify the correct user terminal (using session identifier or port identifier) and identify the input ports of the terminal (using the port identifier, port notification or session identifier). The media content of the new channel can then be sent to the terminal, where it is rendered.

In order to provide a seamless transmission from unicast to multicast/broadcast or vice verse, a preferred approach is to keep both reception mechanisms in parallel for some time so that no packets are lost at the transition.

The SIP-based channel switch and switch between unicast and multicast/broadcast during an ongoing media session has the major advantage in that identical stream can be sent over both multicast/broadcast and unicast. This gives a big flexibility in the choice of media codecs and facilitates a seamless change of distribution mechanism.

The amount of data that has to be included in the SIP INVITE message used for switching between unicast media channels or returning to unicast delivery following multicast/broadcast during an ongoing media session depends on the amount of data the media server stores for media session. For example, the first SIP INVITE message of the present invention that was sent following the set-up of the media session, notified the media server of the selected terminal input ports and the session identifier (previously selected by the server or the terminal). In such a case, the server can associatively store the port identifier(s) and the session identifier for as long as the current session is active. If the server then later receives a new SIP invite message from the same terminal and includes the assigned session identifier, the server retrieves the session identifier from the message and uses it for look-up the previously notified port identifier(s). In such a case, no dedicated port identifier has to be sent in the SIP INVITE message. If the SIP INVITE message indeed contained new port identifier(s), the media server preferably updates the information of input port for the current media session.

In other embodiments, the media server does not store input port identifiers following reception of SIP BYE (termination) messages. In such a case, the new SIP INVITE message must include the identifier of the input port(s) even if the same port(s) is (are) to be re-used.

The technology described herein provides a major advantage in that a same SIP INVITE message format can be used both for an initial selection of unicast-based media channel, switching between unicast-based media channels and switching from multicast/broadcast-based channel to a unicast-based channel. Furthermore, also these media switches can take place without any session terminations and new session initiations.

As was briefly mentioned in the foregoing, the data signaling between the user terminal and the media server can, at least temporarily, be conducted through the usage of one or more proxy servers. Firstly, such proxy servers can be used to help route requests to the correct current locations of the user terminal and the server. The proxy server(s) can also be employed for authenticating and authorizing users for the media servers. For example, the IMS (IP Multimedia Subsystem) can be employed for charging and security and quality of service control can be managed through RACS (Resource and Admission Control Subsystem).

Figure 6:
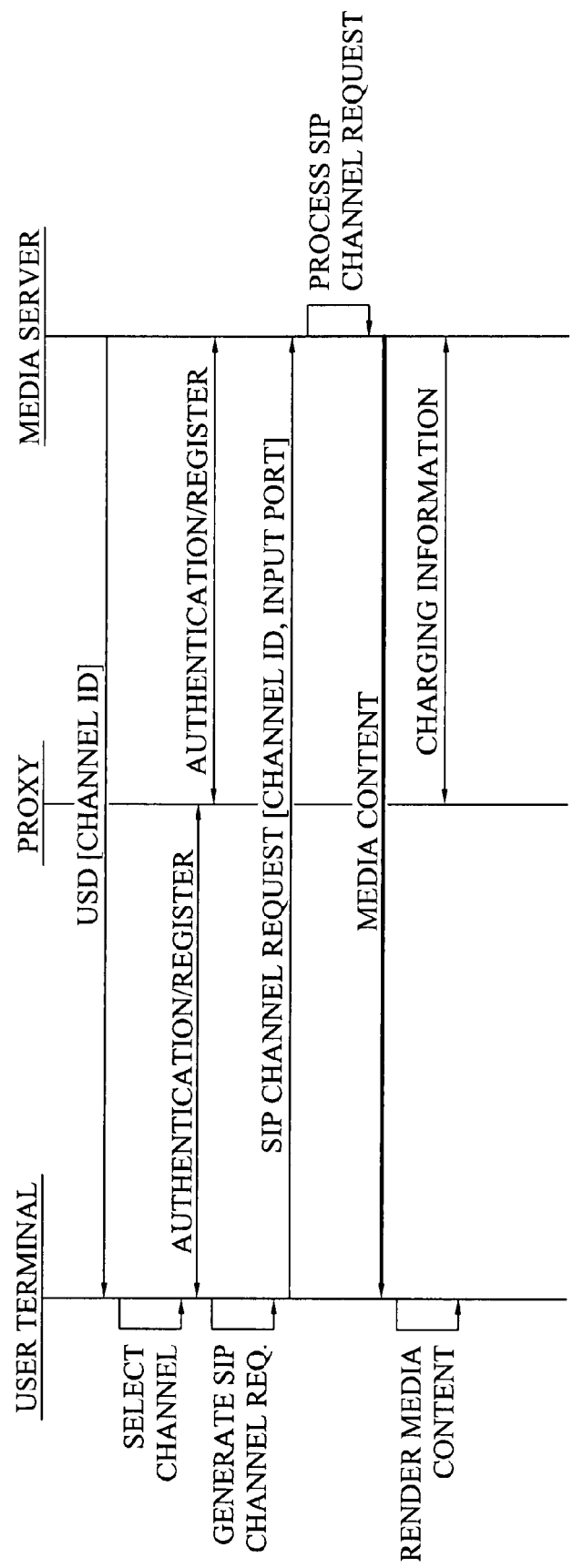
FIG. 6 is a signal diagram illustrating a media session setup procedure according to another example embodiment.

FIG. 6 illustrates a signal diagram where a proxy server is employed for authentication and registering in the media session. The proxy function can, for instance, be handled by an IMS core node, S-CSCF (Serving Call Session Control Function) or HSS (Home Subscriber Server). The media server transmits, such as broadcasts, an USD with channel identifiers and other relevant information as previously described. A user of the terminal selects a media channel it would like to receive such as from a VoD (Video on Demand) catalogue or content stored in an nPVR (Network based Personal Video Recorder).

The user terminal starts an authentication and registering procedure with the proxy server. This procedure typically involves transmitting an identifier of the user terminal such as IMSI (International Mobile Station Identifier) or IMPI (IP Multimedia Private Identity). User authentication and registering can then be conducted according to techniques well-known in the art. Once the proxy server has been satisfied that the user terminal is correctly authenticated and registered at the proxy, it can inform the media server accordingly. In addition, a proxy server-media server authentication and registering procedure can be performed.

The user terminal then compiles and transmits the SIP INVITE message starting the media content delivery as previously described.

The media server can also, continuously, periodically or once the session has been ended, provide charging information to the proxy server. The proxy is then responsible for charging the user terminal for the delivered media content based on the received charging information. The authentication/registering procedure allows the proxy server to identify and charge the correct user. Different techniques for charging users for delivered media content are known in the art and can be applied.

The technology described herein is in particular suited for wireless, radio-based data communication between user terminals and media servers. However, the teachings of the present invention can also be applied for fixed access or in networks that have a combination or wired and wireless data traffic. A typical example is a communication network for providing TV services over IP, such as a broadband access network. The network comprises an IPTV head end connected to a distribution network of data routers, which in turn connects a digital subscriber line (DSL) access multiplexer (DSLAM) with the head end. The DSLAM delivers content from the network cloud to the subscribers at home over DSL lines. The DSLAM is the access node that is the last node in the operator's network. A set top box (STB) or user terminal is connected to the DSLAM.

The technology described herein can be employed between the user terminal (STB) and the DSLAM, whereas multicast techniques are employed between the DSLAM and the IPTV head end. Thus, for DSL access, the STB can use unicast transport over the access link and SIP INVITE/BYE messages according to the present invention towards the DSLAM or the application server in the DSLAM. This avoids the risk of overloading the access link due to slow IGMP leave process when switching media channels. This would also facilitate insertion of personalized content into the stream by the DSLAM towards the user.

Figure 7:
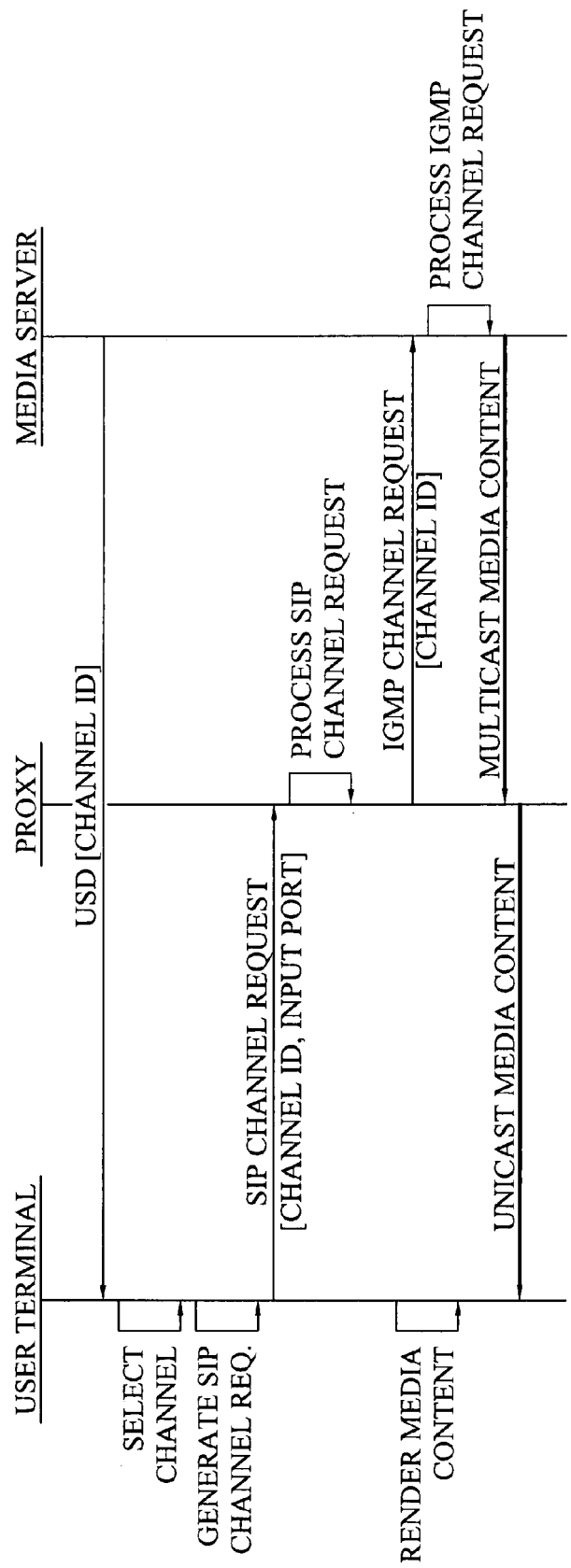
FIG. 7 is a signal diagram illustrating a media session setup procedure according to a further example embodiment.

FIG. 7 is a signal diagram of such an approach. The user terminal (STB) receives a USD or other channel description originating from the media server (IPTV head end), possibly through the proxy server (DSLAM). A SIP INVITE message is generated as previously described following the user selecting a particular media channel. This INVITE message is, however, in the current example embodiment sent to the proxy server that processes the SIP INVITE message for generating a media request message, typically an IGMP join message. In more detail, the proxy server retrieves the channel identifier and uses that information for composing the IGMP join message regarding the multicast/broadcast channel. The proxy also notifies the particular ports to which the data should be sent, unless it already has this information. The IGMP join request is sent to the media server that identifies the media channel to multicast to the proxy server. Media content of the channel is multicast/broadcast to the proxy server, where the proxy server processes the content and forwards it to the user terminal but in the form of unicast delivery. The multicast media data is input to the proxy and unicast media data is output and sent to the user terminal. In this approach, the proxy server could be regarded as taking the role of the media server as defined in the previous embodiments.

It is anticipated that no IGMP join request need to be sent to the media server if the requested multimedia stream is already available at the proxy server as some other connected user terminal is currently listening to that stream.

When switching media channel, the user terminal compiles SIP BYE and transmits it to the proxy server. The proxy uses the input SIP message for compiling an IGMP leave message that is sent to the media server. Correspondingly, a new SIP INVITE is compiled and sent to the proxy server, which converts the message into a new SIP join message destined to the media server.

Figure 8:
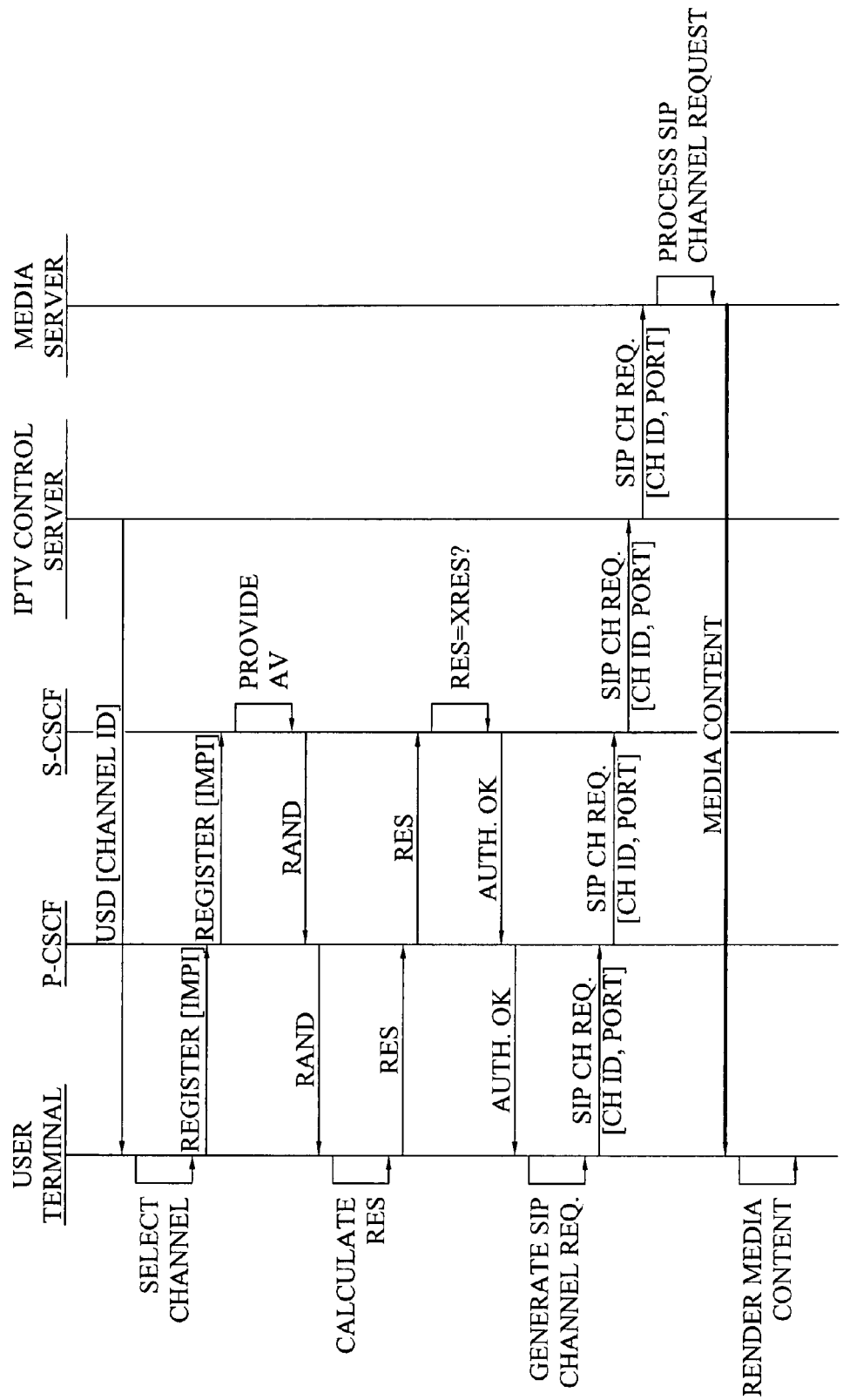
FIG. 8 is a signal diagram illustrating a media session setup procedure according to still another example embodiment.

FIG. 8 is a more detailed signal diagram involving an IMS system in addition to the user terminal and the media server. The network also comprises an IPTV control server that contains and handles information relating to the media channels available at the media server. Therefore, in this embodiment the IPTV control server transmits the channel description to the user terminal. First, a registration and authentication procedure is initiated before or after the user terminal has received information of a selected media channel. The terminal compiles and transmits a register message to a P-CSCF (Proxy Call Session Control Function). The register message comprises a previously assigned IMPI associated with the user terminal or its user. The P-CSCF forwards the register message to the home network of the terminal, i.e. to the S-CSCF. The S-CSCF provides an authentication vector comprising a random number (RAND) and a result (XRES) calculated from RAND and using one or more keys that is/are available to both the S-CSCF and the user terminal associated with the IMPI. The RAND is returned to the user terminal via the P-CSCF, where the terminal uses its version of the key(s) to calculate a corresponding result (RES). The result RES is sent to the S-CSCF via the P-CSCF, where this received result is compared to the result XRES that the network node itself has calculated. If the two matches, the user terminal is regarded as correctly identified. An authentication acknowledgement is then returned to the user terminal.

The terminal can now generate the SIP INVITE message with the included channel identifier and port identifier(s). The message is sent via the different proxy servers (P-CSCF, S-CSCF and IPTV control server) to the media server. Media content can then be sent and rendered by the user terminal as previously described.

The SIP-based signalling of the present invention for setting up a unicast media session can be used together with RTSP for stream control. This allows a terminal to set up a unicast session using SIP with an RTSP-based media server. An IPTV control server supports a gateway capability that converts SIP into RTSP for interworking with media servers that support only RTSP.

The SIP signalling preferably uses the IMS core network, enabling the SIP signalling to be conducted securely using IMS security schemes, which will guarantee authorized access in addition to ensuring that the SIP signalling is integrity and confidentiality protected. To ensure authenticity of the user terminals using RTSP signalling for stream control of established media streaming sessions, RTSP traffic preferably goes through the IPTV control server and not directly to the media server.

Figure 9:
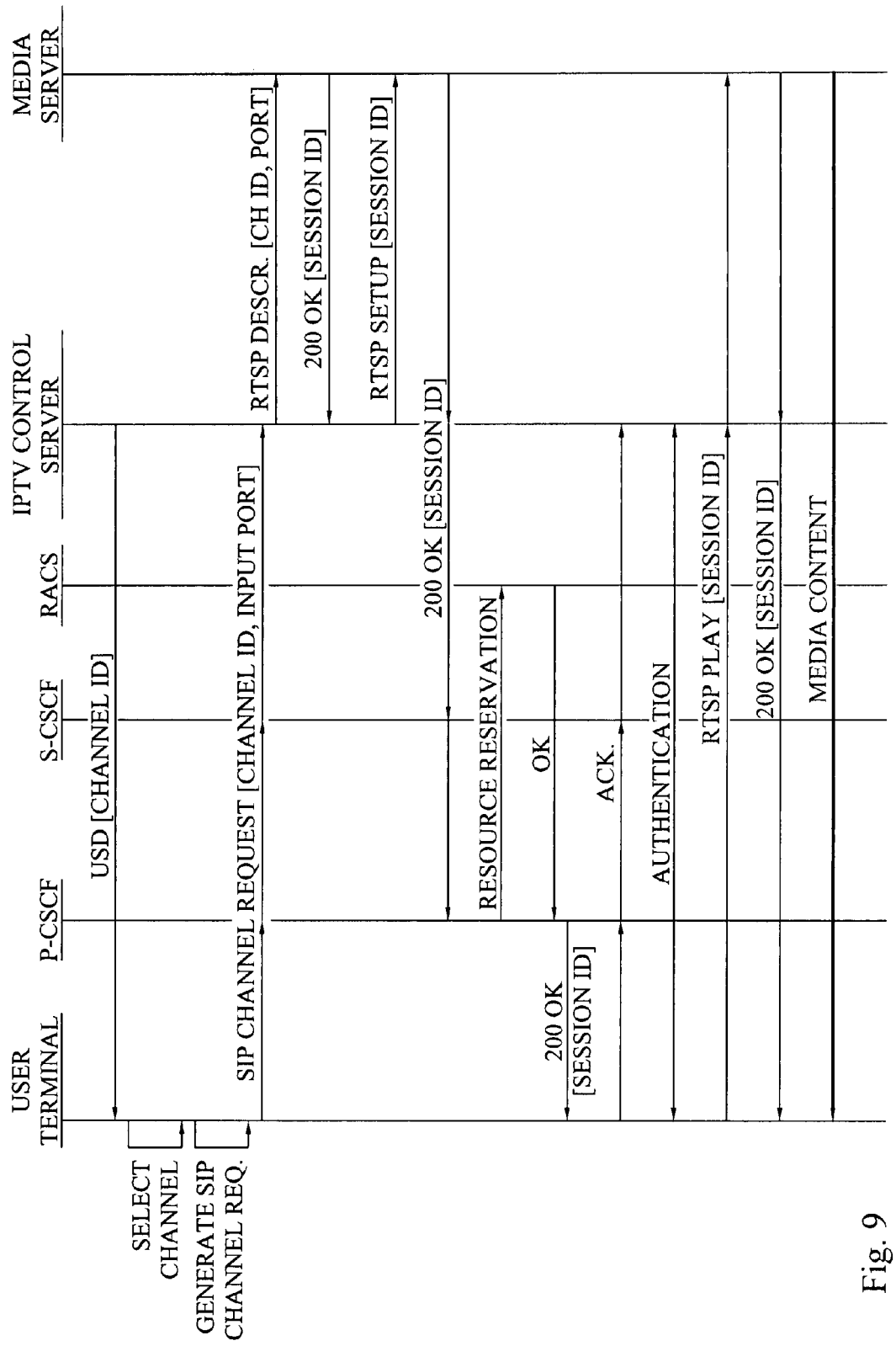
FIG. 9 is a signal diagram illustrating a media session setup procedure according to a further example embodiment.

FIG. 9 illustrates a signalling diagram of a combined SIP and RTSP session set-up and control. The signalling starts as previously described, with the reception of a channel description, typically sent by the IPTV control server or broadcast by the media server itself. The user selects a unicast media channel, such as IPTV service. The terminal compiles and sends a SIP INVITE message according to the present invention to the P-CSCF. The P-CSCF forwards the INVITE message to the S-CSCF and then to the IPTV control server.

The IPTV control server establishes an RTSP session with the media server using the offer included in the SDP information in the incoming SIP INVITE message. The IPTV server maintains a state for each session as well as the association between them. This RTSP session involves sending an RTSP DESCRIBE message with the SDP information, i.e. channel identifier and user input port identifier(s). The media server returns an acknowledge message (200 OK) message together with a selected session identifier. The control server can now send the RTSP SETUP message containing the previously assigned session identifier. Once the session has been set up, the media server returns a 200 OK message with the session identifier to the control server, which forwards it to the P-CSCF via the S-CSCF.

The P-CSCF having now received an answer to the offer, requests the resources for the session from a RACS (Radio Access Control System). Once the P-CSCF has been notified by the RACS that resources have been reserved, it forwards the 200 OK message with the session identifier to the user terminal. The terminal returns an acknowledgement that is forwarded up to the IPTV control server.

At this point a TLS (Traffic Layer Security) channel can be set up between the user terminal and the IPTV control server. This allows mutual authentication to be established, thus preventing fraudulent terminals from sending illegal RTSP stream control operations that can impact ongoing media sessions for legitimate terminals. In addition, this TLS channel allows securing the RTSP signalling.

The user terminal can then optionally send a stream control operation, RTSP PLAY, comprising the session identifier to the IPTV control server to request the start of the media delivery/streaming. This RTSP PLAY is forwarded to the media server. The media server returns a 200 OK message, which is forwarded to the user terminal and media delivery starts between the media server and the user terminal.

Any subsequent stream control operations, such as RTSP PAUSE or RTSP TEARDOWN is, sent by the terminal to the IPTV control server over the TLS channel and are forwarded to the media server.

Figure 10:
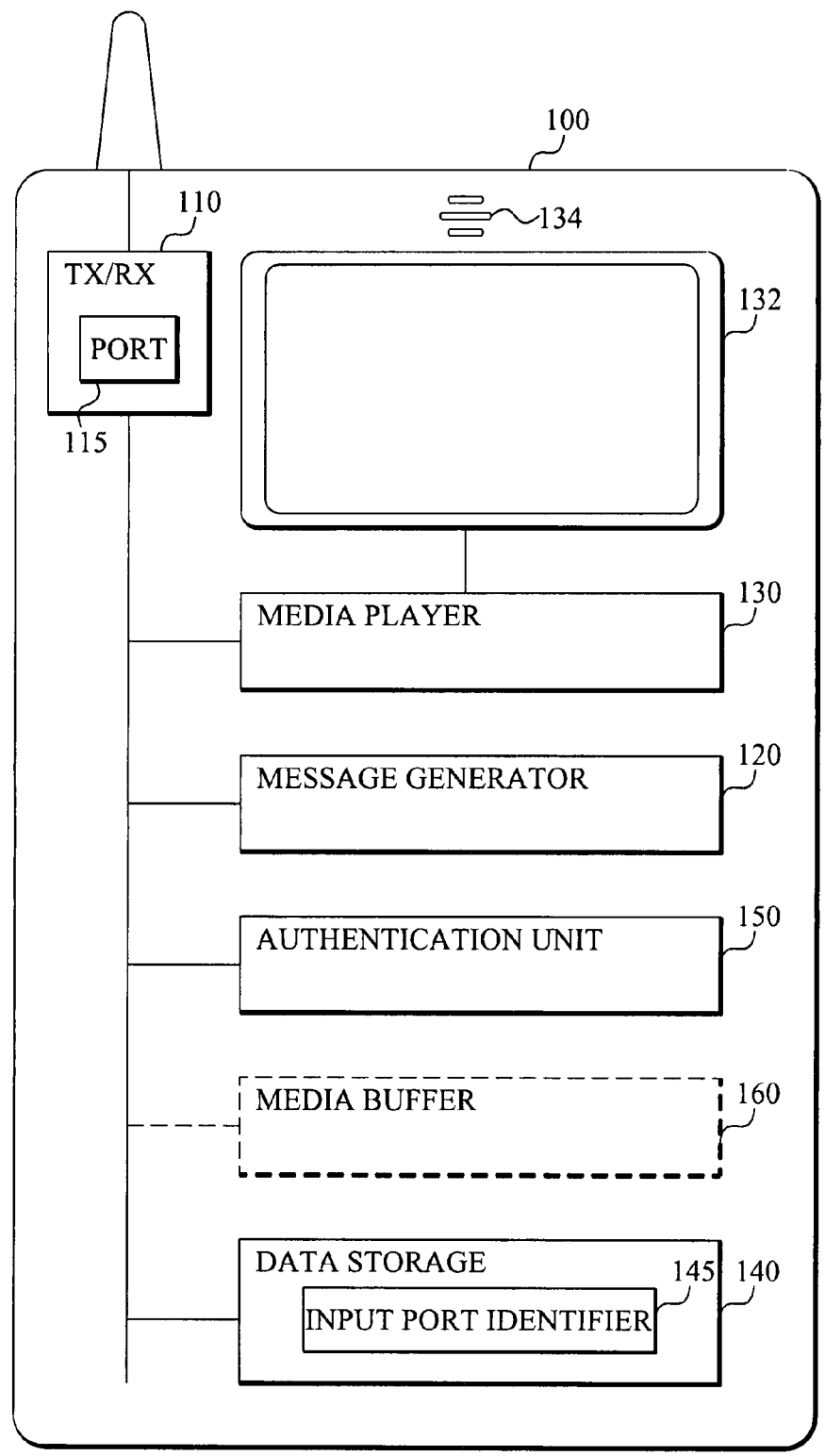
FIG. 10 is a schematic block diagram of a user terminal.

FIG. 10 is a schematic block diagram of a user terminal 100 according to an example embodiment. This user terminal 100 comprises a transmitter and receiver or transceiver 110, schematically illustrated as a single unit in the figure. The unit 110 includes traditional transmitter/receiver functionality, such as modulator/demodulator, encoder/decoder, etc. The receiver part of the unit 110 also has at least one associated input port 115 used for receiving media content in a media session.

The receiver 110 is in particular adapted for receiving a channel description comprising channel identifiers of multiple available media channels at a media server. The channel identifiers are forwarded to a message generator 120 arranged in the user terminal 100 for generating a SIP-based channel request (INVITE message) comprising a channel identifier of the channel identifiers received by the receiver 110. The particular channel identifier to include is selected based on activation of a user input, such as a key, soft key, etc. of the user terminal 100.

The receiver 110 also receives a session identifier assigned to the current media session. This identifier is preferably stored in the data storage 140 for the duration of the media session.

The message generator 120 also includes identifier of the input port 115 to use for the media session. This identifier can be retrieved from a memory location 145 of a data storage 140 containing the different input port identifiers of the terminal 100.

The received channel description also typically comprises further semantics and physical information relating to the media channels. The generator 120 can also use such information in the compiling of the SIP channel request. For example, the generator 120 can select, based on the capabilities of the decoder (not illustrated) of the terminal 100, from different codecs available for the desired media channel. Furthermore, the generator 120 can include the session identifier in the SIP INVITE message if available at the terminal 100 at this point.

The generated SIP message is then forwarded to the transmitter 110, which send the message to a network node, such as directly to the media server or proxy and/or control servers, for initiating delivery of media data of the selected unicast-based media channel to the announced input port 115.

Once the receiver 110 starts receiving media content of the requested channel on the announced input port 115, the content is typically decoded and temporarily stored in a media buffer 160 before being rendered by a media player 130. The media player 130 and its connected display screen 132 and loudspeaker 134 can form part of the user terminal 100. Alternatively, the media player 130, screen 132 and loudspeaker constitute a separate entity connected to the communicating and message processing part of the user terminal 100.

If the user actives another user input for the purpose of selecting another unicast-based media channel available at the media server, the message generator 120 compiles a SIP-based termination message comprising the session identifier. The generator also compiles a second SIP-based channel request comprising the channel identifier, typically retrieved from the data storage 140 in which the channel description has previously been entered, of the newly selected media channel. The generator 120 includes the session identifier and dedicated port identifier unless the same input port(s) is (are) to be re-used and the session identifier is enough to signal this to the media server.

The two SIP-based messages are sent by the receiver to the media server, causing a switch to the new media channel during the ongoing media session without any session teardown and setting up a new session. The media content can then be sent to the input media ports 115 and be rendered by the media player 130.

The same procedure is performed by the user terminal 100 when switching from unicast to multicast/broadcast delivery with the exception that the second SIP-based channel request will be sent first when the user would like to switch back to unicast delivery.

The user terminal 100 preferably also comprises an authentication unit 150 having access to authentication tokens, such as a key, IMPI, IMSI, etc., employed for performing an authentication procedure with the media server or with another network node on behalf of the media server.

The units 110, 120, 130, 150 and 160 of the user terminal 100 may be provided as software, hardware or a combination thereof.

Figure 11:
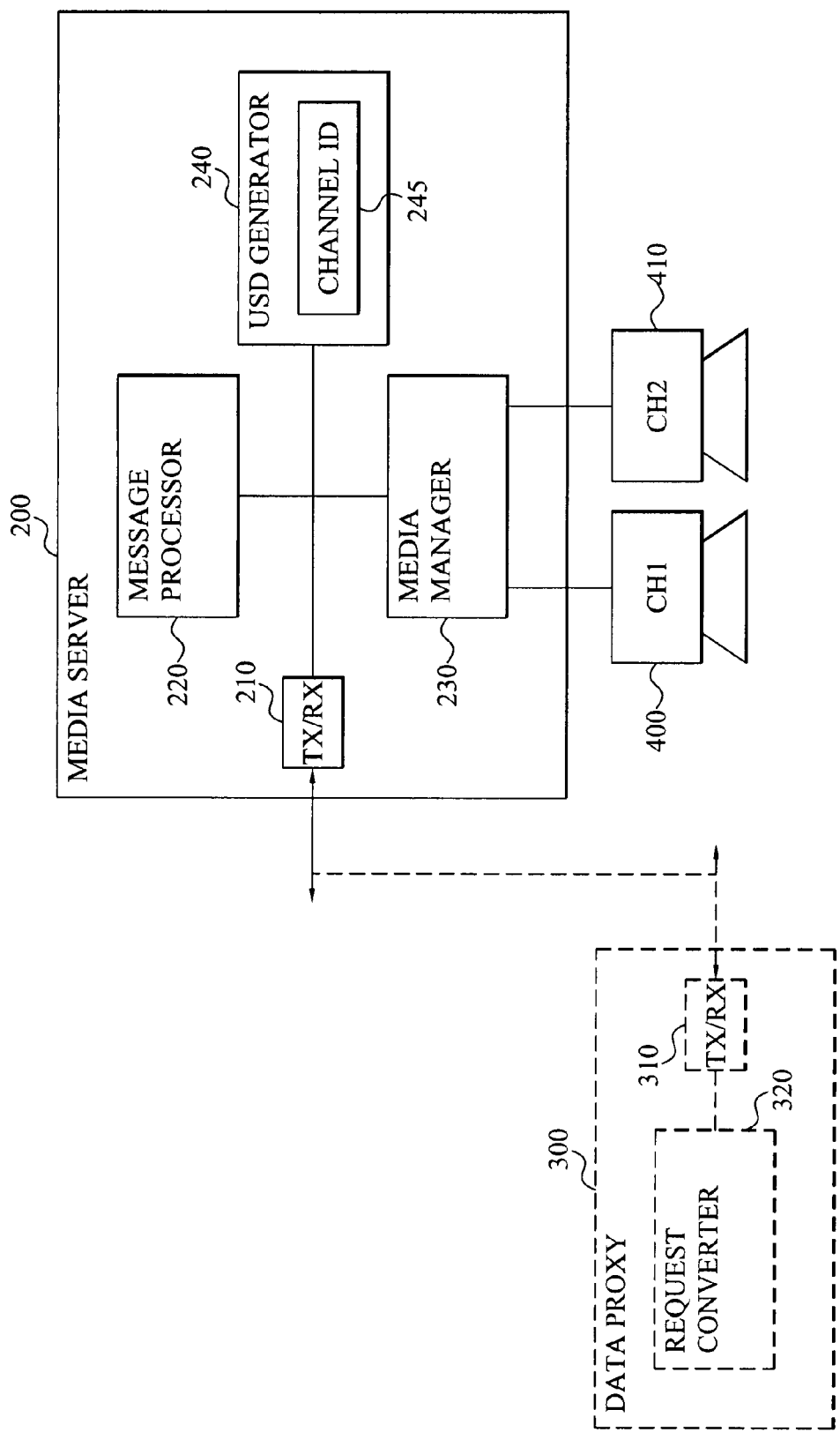
FIG. 11 is a schematic block diagram of a media server.

FIG. 11 is a schematic block diagram of a media server The media server 200 comprises a transmitter and receiver unit 210 arranged for conducting communication with external units and processing incoming and outgoing messages. The transmitter 210 is in particular implemented for transmitting media content to user terminals, SIP-based messages involved in setting up a media session according to the present invention and optionally for sending a channel description to user terminals. The receiver 210 is in particular implemented for receiving SIP-based channel requests and SIP-based channel switching requests from user terminals.

The media server 200 comprises or has access to multiple media channels 400, 410. This means that the server 200 could comprise or be connected to a data bank storing pre-recorded media content. Alternatively, or in addition, the media source could be in the form of live media content received at the media server 200 for further transmission to requesting terminals. A media manager 230 of the server 200 is implemented for taking care of the correct media processing, such as selecting correct media content for the different terminals, generating the data packets with the media content.

The media server 200 preferably also comprises functionality, such as the media manager, or another dedicated unit (not illustrated) for assigning a session identifier to the current media session. This session identifier is returned to the user terminal by the transmitter 210.

The media server 200 further includes a message processor 220 arranged for processing a SIP-based channel request received by the receiver 210 and originating from a user terminal. The processor 220 in particular retrieves the identifier of the desired media channel from the message. This identifier is provided to the media manager 230 for providing the correct media content to the receiver 210 for further transmission to the user terminal. The message processor 220 also retrieves information describing the particular terminal port (s) to which the transmitter 210 should send the content. This information is forwarded to the transmitter 210.

If the channel request also comprises a negotiated codec that the user terminal supports, the processor 220 forwards that information to the media manager 230 to correctly process, encode, the media content according to the capabilities or desires of the user terminal.

The media server 200 preferably also comprises a channel description generator 240 for generating a channel description, such as USD, containing identifiers 245 and further information of the media channels 400, 410 available at the media server 200. The so-generated USD is transmitted, such as broadcast or uploaded, by the transmitter 210.

If the receiver 210 subsequently receives a SIP-based termination message with a session identifier, the message processor uses the session identifier for identifying the particular media flow that should be stopped from the media manager 230 and the transmitter 210. The termination message can also be followed by a new SIP-based channel request comprising the same session identifier. The message processor 220 will then cause the media manager 230 to provide correctly encoded media content of the new channel to the transmitter 210 for delivery to the requesting user.

The media server 200 can also have at least one associated or serving data proxy 300. This data proxy 300 can for example be employed for converting SIP-based channel requests originating from user terminals and received by a receiver 310 of the proxy 300 using a request converter 320 into, for example, RTSP-based channel requests. The so-converted requests can then be transmitted to the media server 200 that will delivery the correct media content to the requesting user.

The units 210 to 240 of the media server 200 may be provided as software, hardware or a combination thereof. The units 210 to 240 may all be implemented in a network node of a communication network. Also a distributed implementation with some of the units 210 to 240 arranged at different nodes in the network is possible. The units 310 and 320 of the data proxy 300 may be provided as software, hardware or a combination thereof. The units 310 and 320 may all be implemented in a network node of a communication network. Also a distributed implementation with some of the units 310 and 320 arranged at different nodes in the network is possible. The media server 200 and the data proxy 300 can be arranged in a same network node or different network nodes of the system.

Figure 12:
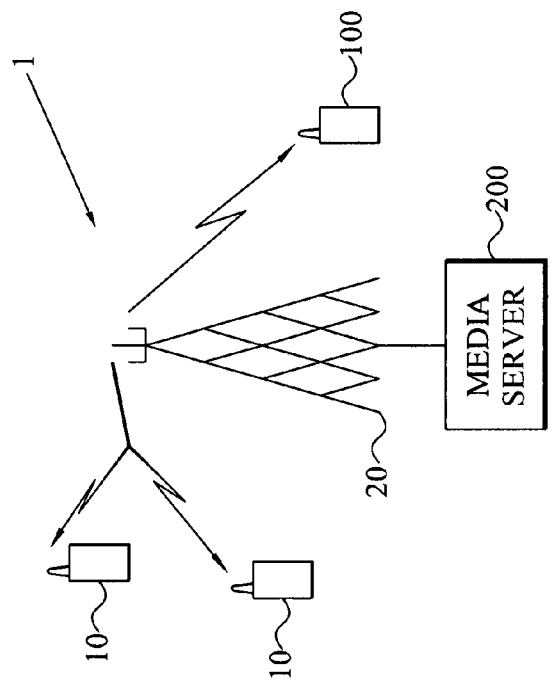
FIG. 12 is a schematic overview of a portion of a communication system.

FIG. 12 is a schematic overview of a unicast-based wireless communications system 1 according to an example embodiment. The communications system 1 comprises a base station or network node 20 transmitting media content to connected user terminals 10, 100. This base station 20 comprises or is connected to a media server 200 of the invention having multiple available unicast-based media channels. In the figure, a first user terminal 100 listens to one of these unicast-based media channels. Two other user terminals 10, however, listen to a multicast/broadcast channel also being available at the media server 200.

It will be understood by a person skilled in the art that various modifications and changes may be made without departure from the scope of the appended claims.

REFERENCES

[1] WO 2006/096104
[2] 3GPP TS 26.234 v7.1.0; $3^{rd}$ Generation Partnership Project; Technical Specification group Services and System Aspects; Transparent end-to-end Packet-switched Streaming Service (PSS); Protocols and codecs, December 2006
[3] Network Working Group, Request for Comments: 2326, April 1998, Real Time Streaming Protocol (RTSP)
[4] Network Working Group, Request for Comments: 3261, June 2002, SIP: Session Initiation Protocol
[5] Network Working Group, Request for Comments: 2327, April 1998, SDP: Session Description Protocol

The invention claimed is:

1. A method of managing a unicast-based media session associated with a session identifier, said method comprising the steps of:

a user terminal receiving channel identifiers of multiple available media channels;

said user terminal generating a first Session Initiation Protocol (SIP) based channel request comprising a first channel identifier selected from said received channel identifiers and a port identifier of at least one media input port of said user terminal;

said user terminal transmitting said SIP-based channel request to a network node for initiating delivery of media data of a first media channel to said at least one media input port;

said user terminal transmitting a SIP-based termination message comprising said session identifier to said network node;

said user terminal generating a second SIP-based channel request comprising a second channel identifier selected from said received channel identifiers and a port identifier of at least one media input port of said user terminal; and said user terminal transmitting said second SIP-based channel request to said network node for initiating delivery of media data of a second media channel to said at least one media input port, wherein said step of generating said second SIP-based channel request comprises said user terminal generating said second SIP-based channel request comprising said second channel identifier and a notification specifying that said at least one media input port identified in said first SIP-based channel request is to be re-used for said second media channel.

2. A method of managing a unicast-based media session involving a user terminal and a media server providing multiple media channels, said unicast-based media session being associated with a session identifier said method comprising the steps of:

said media server receiving a first Session Initiation Protocol (SIP) based channel request originating from said user terminal and comprising a first channel identifier associated with a first media channel of said multiple media channels and a port identifier of at least one media input port of said user terminal;

said media server processing said first SIP-based channel request for providing media content of said first media channel;

said media server transmitting media content of said first media channel to said at least one media input port of said user terminal;

said media server receiving a SIP-based termination message originating from said user terminal and comprising said session identifier;

said media server terminating, based on said SIP-based termination message, transmission of media content of said first media channel to said at least one media input port of said user terminal;

said media server receiving a second SIP-based channel request originating from said user terminal and comprising a second channel identifier associated with a second media channel of said multiple media channels and a port identifier of at least one media input port of said user terminal;

said media server processing said second SIP-based channel request for providing media content of said second media channel; and said media server transmitting media content of said second media channel to said at least one media input port of said user terminal, wherein said transmitting step comprises said media server transmitting media content of said second media channel to said at least one media input port identified in said first SIP-based channel request originating from said user terminal.

3. A user terminal comprising:

a receiver for receiving channel identifiers of multiple available media channels;

a message generator arranged to generate a first Session Initiation Protocol (SIP) based channel request comprising a first channel identifier selected from said channel identifiers received by said receiver and a port identifier of at least one media input port of said user terminal; and a transmitter for transmitting said SIP-based channel request to a network node for initiating delivery of media data of a first unicast-based media channel to said at least one media input port, said message generator is further arranged to i) generate a SIP-based termination message comprising a session identifier associated with a current unicast-based media session, and ii) generate a second SIP-based channel request comprising a second channel identifier selected from said channel identifiers received by said receiver and a port identifier of at least one media input port of said user terminal, and said transmitter is arranged to i) transmitting said SIP-based termination message to said network node, and ii) transmitting said second SIP-based channel request to said network node for initiating delivery of media data of a second media channel to said at least one media input port, wherein said message generator is arranged to generate said second SIP-based channel request comprising said second channel identifier and a notification specifying that said at least one media input port identified in said first SIP-based channel request is to be re-used for said second media channel.

4. A media server providing multiple unicast-based media channels, said media server comprising:

a receiver for receiving a first Session Initiation Protocol (SIP) based channel request originating from a user terminal and comprising a first channel identifier associated with a first media channel of said multiple media channels and a port identifier of at least one media input port of said user terminal;

a message processor configured to process said first SIP-based channel request for providing media content of said first media channel; and a transmitter for transmitting media content of said first media channel to said at least one media input port of said user terminal, said receiver is configured to i) receive a SIP-based termination message originating from said user terminal and comprising a session identifier associated with a current unicast-based media session, and ii) receive a second SIP-based channel request originating from said user terminal and comprising a second channel identifier associated with a second media channel of said multiple media channels and a port identifier of at least one media input port of said user terminal, said message processor is further configured to i) terminate, based on said SIP-based termination message, transmission of media content of said first media channel to said at least one media input port of said user terminal, and ii) process said second SIP-based channel request for providing media content of said second media channel, and said transmitter is configured to transmit media content of said second media channel to said at least one media input port of said user terminal, wherein said transmitter is configured to transmit media content of said second media channel to said at least one media input port identified in said first SIP-based channel request originating from said user terminal.

* * * * *

UNITED STATES PATENT AND TRADEMARK OFFICE
CERTIFICATE OF CORRECTION

| | | |
|---|---|---|
| PATENT NO. | : 8,046,479 B2 | |
| APPLICATION NO. | : 11/826026 | |
| DATED | : October 25, 2011 | |
| INVENTOR(S) | : Einarsson et al. | |

It is certified that error appears in the above-identified patent and that said Letters Patent is hereby corrected as shown below:

On the Face Page, in Field (57), under "ABSTRACT", in Column 2, Lines 10-11, delete "unicast-bast" and insert -- unicast-based --, therefor.

On Page 2, in Field (56), under "FOREIGN PATENT DOCUMENTS", in Column 1, Line 2, delete "WO WO2004/021668 A1 3/2004".

On Page 2, in Field (56), under "FOREIGN PATENT DOCUMENTS", in Column 1, Line 4, delete "WO WO2006/057606 A1 6/2006".

On Page 2, in Field (56), under "FOREIGN PATENT DOCUMENTS", in Column 1, Line 5, delete "WO WO2006/096104 9/2006".

In Column 3, Lines 18-21, delete "The invention together.........in which:".

In Column 7, Line 5, delete "eicsson.com;" and insert -- ericsson.com; --, therefor.

In Column 8, Line 16, delete "is most often" and insert -- is often --, therefor.

In Column 15, Line 4, delete "server The" and insert -- server. The --, therefor.

Signed and Sealed this
Seventeenth Day of April, 2012

David J. Kappos
*Director of the United States Patent and Trademark Office*